United States Patent [19]

Zeller et al.

[11] 4,055,383
[45] Oct. 25, 1977

[54] METHOD OF AND ASSEMBLY FOR MEASURING EQUIVALENT SPHERE ILLUMINATION

[75] Inventors: Robert Dale Zeller; Daryl Dean Sullivan, both of Newark, Ohio

[73] Assignee: Johns-Manville Corporation, Denver, Colo.

[21] Appl. No.: 659,616

[22] Filed: Feb. 20, 1976

[51] Int. Cl.² .............................................. G01J 1/10
[52] U.S. Cl. .................................... 356/229; 356/256
[58] Field of Search ............................... 356/229, 232

[56] References Cited

U.S. PATENT DOCUMENTS 3,912,399  10/1975  Griffith et al. ........................ 356/229

OTHER PUBLICATIONS

Ngai et al. Journal of the Illuminating Engineering Society, vol. 5, No. 1, Oct. 1975, pp. 58–65.

Primary Examiner—F. L. Evans
Attorney, Agent, or Firm—Robert M. Krone; Joseph J. Kelly; Stephen C. Shear

[57] ABSTRACT

The measurement of equivalent sphere illumination on a given task located in a lighted area is disclosed herein. This is accomplished by comparing a movably mounted task in the lighted area with the same task in a control area illuminated with sphere illumination. The task is viewed alternatively in the two areas in accordance with specific optical procedures to determine the equivalent sphere illumination on the task in the lighted area.

14 Claims, 9 Drawing Figures

U.S. Patent  Oct 25, 1977  Sheet 1 of 3  4,055,383
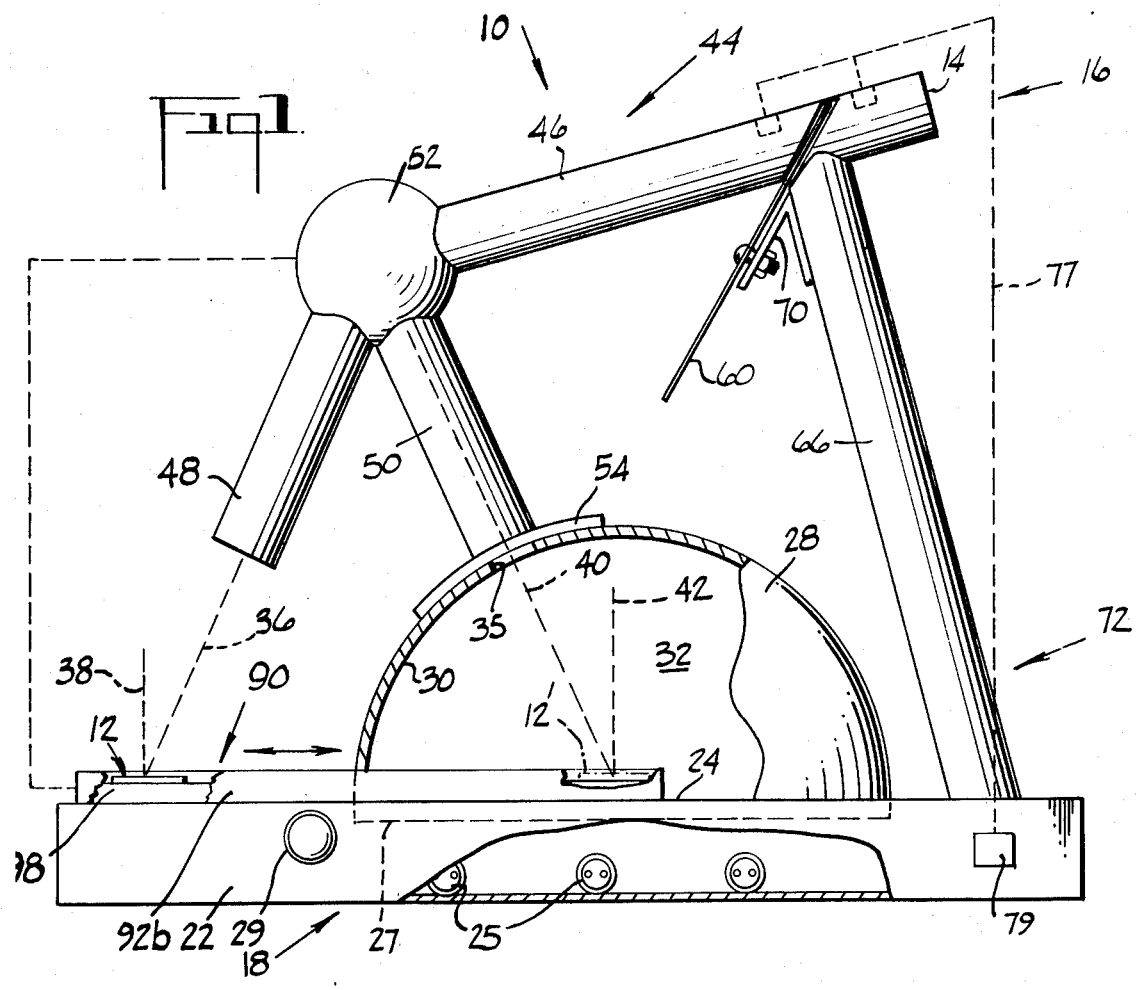
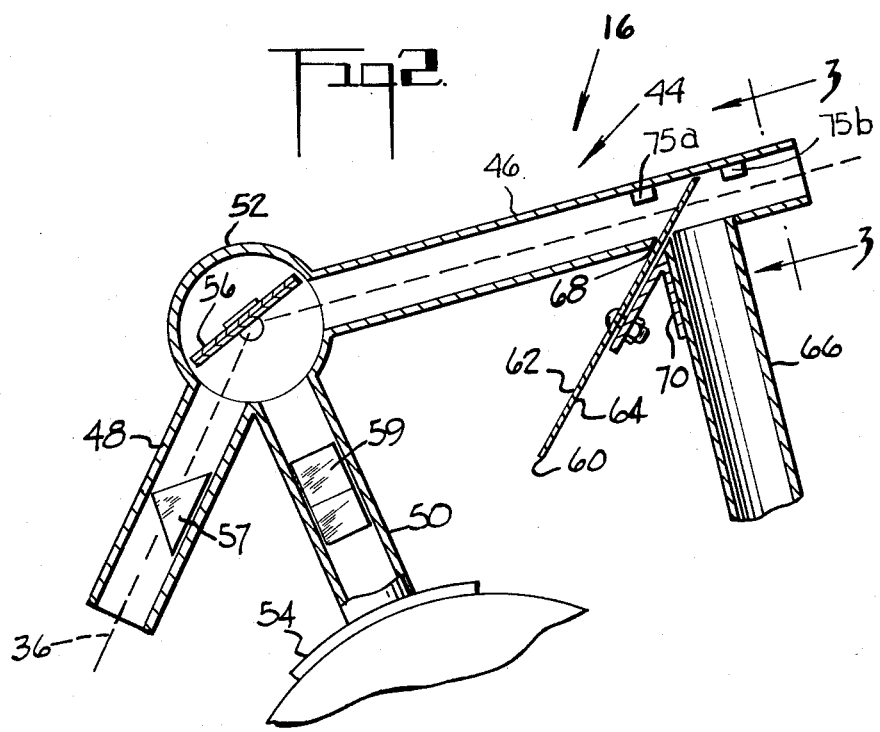

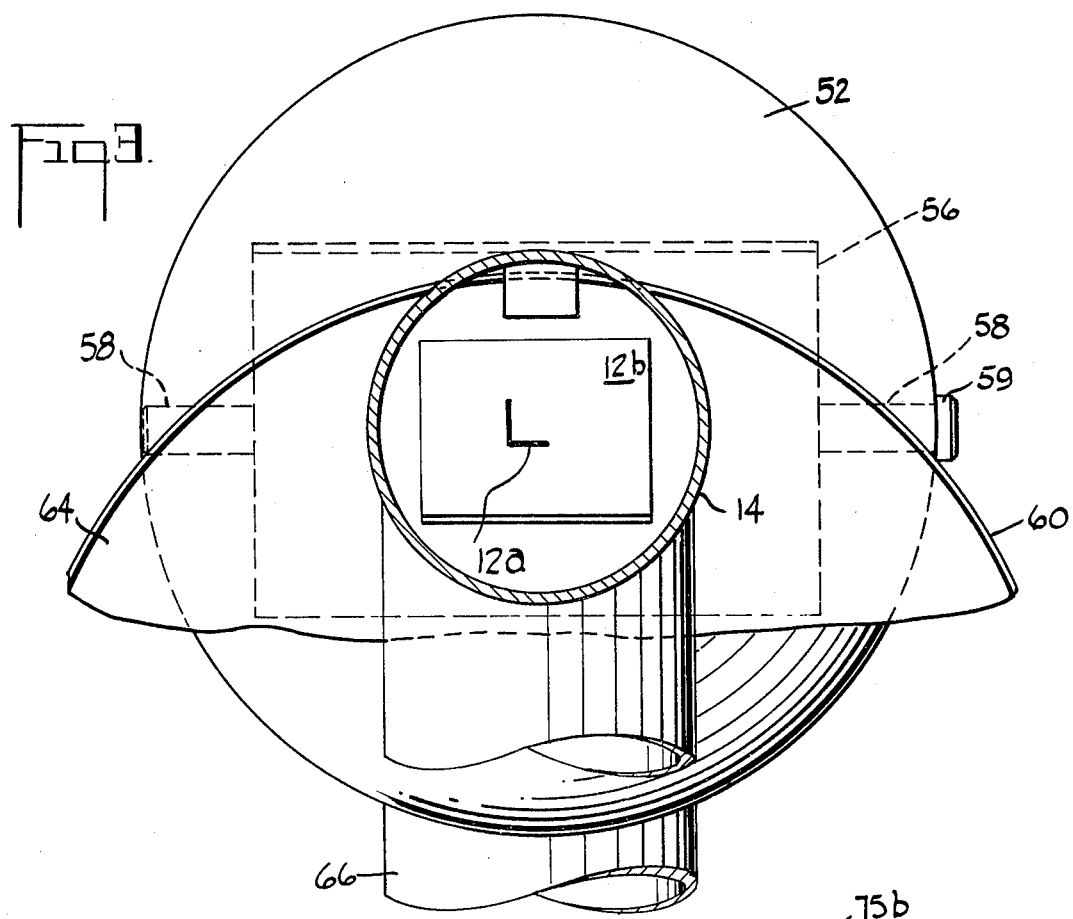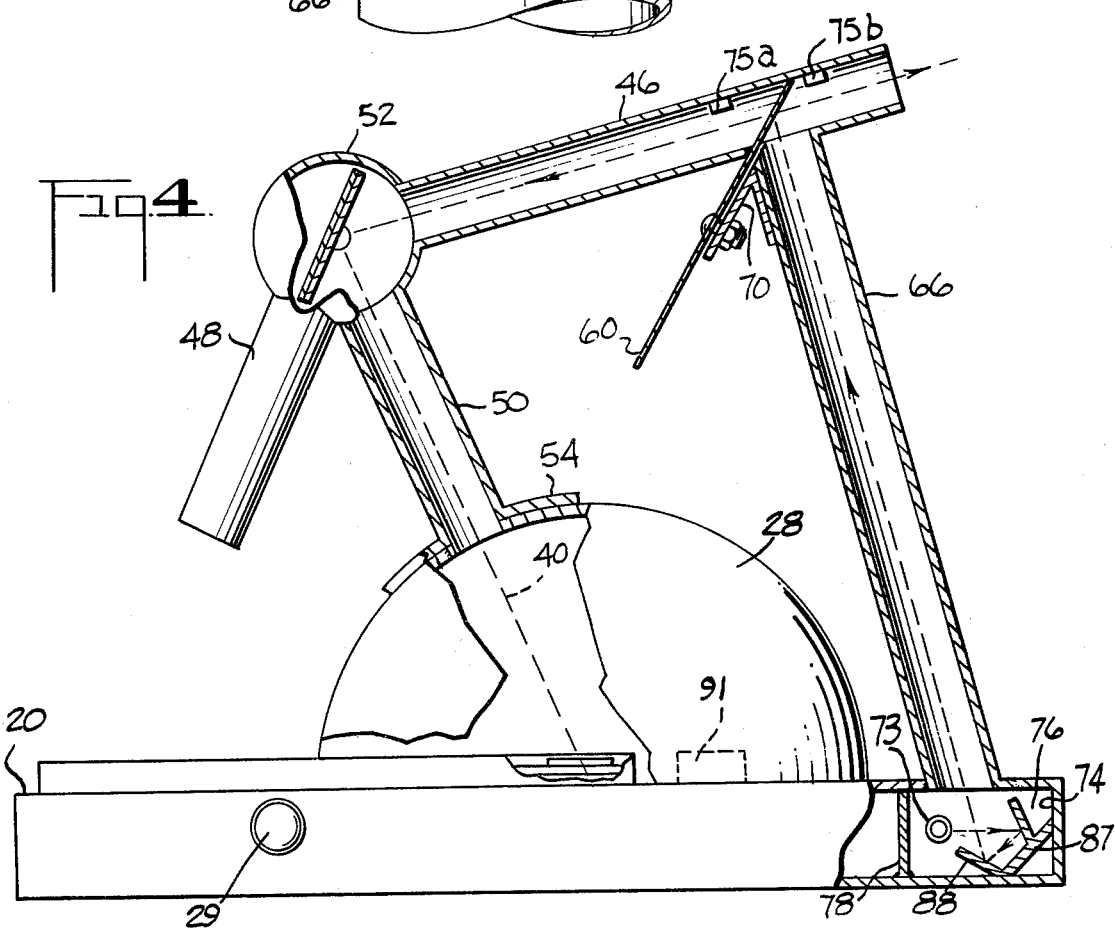

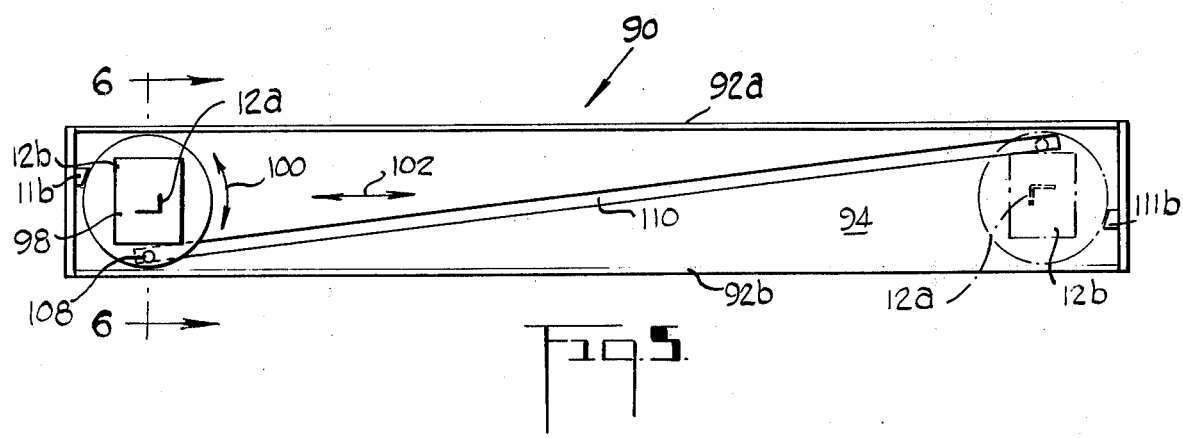
Fig. 5.
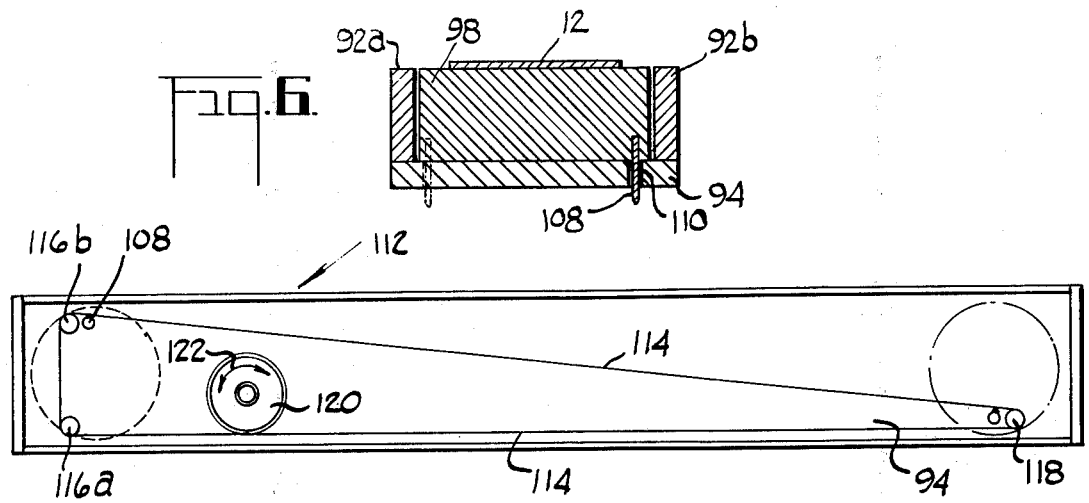
Fig. 6.
Fig. 7.
(a) L
(b) ⌈
(c) L
} Fig. 8.
(a) ⌉
(b) ⌋
(c) L
} Fig. 9.

METHOD OF AND ASSEMBLY FOR MEASURING EQUIVALENT SPHERE ILLUMINATION

BACKGROUND OF THE INVENTION

The present invention relates generally to sphere illumination and more particularly to an improved method of and improved assembly for measuring equivalent sphere illumination.

The term "equivalent sphere illumination", commonly referred to and hereinafter referred to as ESI, is well known in the lighting industry. The illumination on a task, for example, the writing on a piece of paper, within a room depends upon the position of the task within the room and the particular lighting arrangement utilized therein. In any event, while most conventional lighting arrangements do not provide complete sphere illumination, they do provide illumination, which produces some visibility equal to the visibility produced by an equivalent amount of sphere illumination. The term ESI refers to this level of sphere illumination.

The amount of ESI on a task within a conventionally lit room will depend not only on the position of the task within the room but also upon the orientation of the task relative to the point at which it is viewed. If, for example, at the viewing point of the task there is a loss of contrast from veiling reflection, i.e., reflected glare off the task, the ESI as viewed at that point will be small. On the other hand, where there is little loss in contrast at the viewing point, the ESI will be greater.

An often used "yardstick" of the lighting industry in evaluating the quality of illumination in a lighted room is the amount of ESI on a task, as viewed from a particular point. A typical task is a typed letter or other dark symbol on a sheet of white paper, the sheet being located on a flat, horizontal surface. A standard viewing point is above the paper at an angle of approximately 25° from a line normal to the paper, i.e., the average viewing point of a person sitting at a desk or table reading what is typed on the paper. Generally, as stated above, it has been found that less veiling reflection from the paper results in higher ESI values while greater reflected glare results in lower ESI values.

While ESI is one sound and, more than likely, permanent tool in evaluating given lighting arrangements, there has heretofore been a substantial drawback resulting from its use. This drawback resides in the manner in which the ESI is measured. Most of the known methods provided heretofore are complicated, time consuming and expensive. The drawback just referred to has been overcome by a method of and assembly for measuring ESI disclosed in U.S. application Ser. No. 446,247 (Griffith et al.), filed Feb. 27, 1974, and assigned to the Assignee of the present application, now U.S. Pat. No. 3,912,399.

As will be seen hereinafter, the present invention is directed to improvements in the method and assembly disclosed in this application. More specifically, the method and assembly disclosed in the application just referred to utilizes two preferably identical tasks, one of which is the task being evaluated located in the lighted area being evaluated and the other of which is a control task located in a light controlled area. Applicants of the present invention have discovered several factors which will affect the accuracy of the ESI measurement taken by means of the method and assembly disclosed in the Griffith et al. application.

First, Applicants have discovered that it is not only preferably to use "identical" tasks as stated in the Griffith et al application but to maximize accuracy it is essential to use identical tasks. Second, Applicants have discovered that two independent tasks may be provided and may be made to appear identical to the naked eye, for example two pieces of paper with the same word typed thereon. However, Applicants have found that for purposes of determining ESI using the Griffith et al. method and assembly, these tasks are not identical and, even though they may be as identical as can be achieved by known duplication methods and may appear identical to the naked eye, the unobserved differences can adversely affect the accuracy of the ESI value obtained. Applicants have discovered this by first taking an ESI reading using one task as the task being evaluated and a second identically appearing task as the control task and then repeating this procedure but reversing these tasks, everything else remaining the same. The two readings, in several tests of this type were not always the same. In fact, Applicants have found as large as a 30% difference in these readings where, if the tasks were clearly identical, the reading should be the same.

BRIEF SUMMARY OF THE INVENTION

An object of the present invention is to provide uncomplicated, reliable and economical improvements to the method and assembly disclosed in the above-recited Griffith et al. patent application.

Another object of the present invention is to provide a more accurate method and assembly for measuring equivalent sphere illumination on a give task in a given area.

Still another object of the present invention is to provide a method and assembly which requires only one task which is compared with itself in the area being evaluated and in a light control area under sphere illumination.

As disclosed in more detail hereinafter, a given object is positioned within a lighted area, i.e., the area to be evaluated. The object is preferably a sheet of light colored paper with dark letters or other such symbols on one side, i.e., the side facing up. The letters or symbols may be referred to as the task to be evaluated and the remaining exposed surface of the sheet of paper may be referred to as the background or reference.

The task and at least a portion of the background, are viewed from a given viewing point, for example, the aforedescribed standard viewing point, through an adjustable light filtering device. An optical arrangement is preferably provided to assure that the task is seen as it would be if viewed directly. With the task in the lighted area, the light filtering device is adjusted to a position which provides a specific degree of visibility, preferably threshold visibility, of the task at the viewing point and through the device. However, by appropriate means, preferably by automatic means, the liminance of the background is made to at least appear unchanged as viewed through the adjusted light filtering device from the same viewing point. In other words, the background, as viewed through the adjusted light filtering device, is made to appear as it would be if viewed without any of the light being filtered.

In accordance with the present invention, the same object, actually task, is thereafter moved, preferably automatically, into a light controlled area and illuminated with sphere illumination. To provide this sphere illumination, the light controlled area preferably includes a hemispherical surface which substantially uniformly diffusely reflects light directed thereon. In this second position, the task and at least a portion of the background or reference are viewed through the already adjusted light filtering device with the orientation of the task, as viewed, being identical to its orientation as viewed in the area being evaluated. In addition, a second optical arrangement is preferably provided to assure that the task within the light controlled area is seen in the same way as it would be if viewed directly and as it is seen when located in the lighted area being evaluated.

While viewing the object through the adjusted light filtering device, the intensity of sphere illumination on the object is varied to the point which provides equal visibility to the task in the area being evaluated and in the light controlled area, i.e., preferably threshold visibility. As the same time, by appropriate means, preferably automatic means, the liminance of the background while viewing the task in the light controlled area is made to appear unchanged, as viewed through the already adjusted light filtering device. In other words, the background, as viewed through the already adjusted light filtering device, is made to appear as it would be if viewed without any of the light being filtered. The value of the sphere illumination at this point is the ESI on the given object in the area being evaluated from the point as which the given object is viewed. By measuring this value, the ESI is readily determined.

BRIEF DESCRIPTION OF THE DRAWINGS

FIG. 1 is a partially broken away side elevational view of an assembly which is provided for measuring ESI on an object and which is constructed in accordance with the present invention.

FIG. 2 is a sectional view of an optical portion of the assembly of FIG. 1.

FIG. 3 is an enlarged sectional view taken generally along line 3—3 in FIG. 2.

FIG. 4 is partially broken away side elevational view of the assembly of FIG. 1 with a portion of the assembly being shown in section and also being shown in a different mode of operation than that illustrated in FIG. 2.

FIG. 5 is a plan view of a particular feature of the assembly illustrated in FIGS. 1 and 4.

FIG. 6 is a sectional view of the feature illustrated in FIG. 5, taken generally along line 6—6 in FIG. 5.

FIG. 7 is a schematic illustration of a portion of the feature illustrated in FIG. 6.

FIGS. 8 and 9 illustrate a task used with the assembly of the present invention and shown in different positions, depending on how they are viewed.

DETAILED DESCRIPTION AND PREFERRED EMBODIMENTS

Turning now to the drawings, wherein like components are designated by like reference numerals throughout the various figures, an assembly 10, constructed in accordance with the present invention, is illustrated in FIG. 1. Assembly 10 is provided for determining the amount of equivalent sphere illumination (ESI) on an object 12, as viewed from a given viewing point, for example, point 14 along a line 36, the object being supported by suitable means to be discussed hereinafter. To accomplish this in a specific way, to be described hereinafter, assembly 10 includes an optical arrangement 16 and an arrangement 18 for producing sphere illumination. As will be seen hereinafter, assembly 10 functions generally in the same manner as the assembly disclosed in previously mentioned U.S. Pat. No. 3,912,399, however with certain specific improvements to be discussed below.

Object 12 may be any suitably sized and shaped object including two contrasting colored segments, i.e., a task and a reference, or it may be two separate contrasting colored objects. However, object 12 is preferably a sheet of light colored (preferably white) paper having a typed or other such contrasting colored symbol (preferably black or dark blue) on one surface. For purposes of the present description of assembly 10, it will be assumed that object 12 is a sheet of white paper including such a symbol, for example the letter 1 illustrated in FIG. 3 and FIGS. 8 and 9, or it may be an entire word. The symbol will hereinafter be referred to as a task and the remaining surface of the sheet of paper will hereinafter be referred to as a reference or background.

As illustrated in FIG. 1, arrangement 18 includes a light box 22 having one side, for example, top side 24, which allows light from within the box to pass therethrough. Side 24 is preferably designed to uniformly diffuse this light, which originates from one or more light sources 25 located within the light box and suitably mounted by means not shown. Moreover, light box 22 includes means for varying the light passing through top side 24. This may be accomplished, for example, by varying the electrical voltage across the light sources or by maintaining the light sources energized and utilizing a mechanical filtering system. Both of the methods could be readily provided by one with ordinary skill in the art. In one embodiment, a mechanical shutter arrangement, represented by dotted line 27, movable between a completely closed and a completely open position is provided. Such an arrangement could be readily provided by one with skill in the art. In this regard, a nob 29 or other such means suitably connected to the shutter arrangement could be utilized for manually varying the amount of light passing up through side 24 from no light at all to most of the light passing therethrough. By the same token, where the voltage is regulated to vary the light, nob 29 could be used in conjunction with a dimmer. The maximum amount of light which light box 22 must provide will depend upon several factors to become apparent hereinafter.

Arrangement 18 also includes a light impervious shell 28 having a hemispherical internal surface 30. This surface is one which, as close as possible, perfectly and uniformly diffusely reflects light. One way and probably the more accurate way of accomplishing this it to provide surface 30 with a uniform coating of smoked magnesium oxide, that is, the precipitate resulting from burning magnesium. One drawback in using smoked magnesium oxide is that it displays little peel or chip resistance. Hence, a second probably slightly less accurate but suitable way of providing uniform light diffusion is to provide surface 30 with a uniform coating of flat white paint. There may, of course, be other ways to provide surface 30 with uniform light diffusion. Shell 28 is positioned on top side 24 of light box 22 such that the top surface of this side and internal surface 30 of the shell together define a closed hemispherical chamber 32.

From the foregoing, it should be apparent that light passing from light box 22 through the top surface of side 24 and onto hemispherical surface 30 will be uniformly diffusely reflected by surface 30. This diffusely reflected light provides spherical illumination on the exposed surface or surfaces of an object within chamber 32. Because of practical considerations, absolute spherical illumination cannot be completely attained. For example, practically speaking, surface 30 is not absolutely hemispherical but is as close to hemispherical as possible. Further, this surface does not provide absolute uniform diffusion but, as close as practically possible, uniformly diffuses light directed thereon. However, for purposes of the present invention, slight deviations from the production of perfect spherical illumination within chamber 32 may be and, for all practical purposes, must be tolerated.

As stated above, assembly 10 includes means for supporting object 12. This means could be, for example, a desk or table or the top flat surface of an extension connected to and extending from one side of light box 22. However, as will be seen hereinafter, this support means is comprised of an arrangement which moves object 12 into and out of shell 28 over the top surface of light box 22.

As also stated above, assembly 10 includes optical arrangement 16. As will be described below, this arrangement is provided, at least in part, for viewing object 12 in a position outside chamber 32 and also for viewing the same object as a reference object within chamber 32 and on top side 24. In this regard, shell 28 includes a slot or other such opening 35 extending from its outer surface to inner surface 30 for allowing external viewing into chamber 32. The size of slot 35 depends upon the size of object 12 but, in any case, should not be so large as to significantly adversely affect the production of sphere illumination within the chamber. The position of slot 35 will depend upon the desired position of object 12 within chamber 32, which desired position will be discussed below.

In accordance with the present invention, object 12 is used as both the object being evaluated outside chamber 32, i.e., in the lighted area being evaluated, and as the reference object within chamber 32. Means for moving this object between these two positions in a particular way will be described hereinafter. While a single object is used, for purposes of simplicity and convenience, it will be referred to by the reference numeral 12 when functioning as the object being evaluated outside chamber 32 and by the reference numeral 12' when functioning as the reference object in chamber 32. Hence, reference to reference object 12' actually refers to object 12 but in its reference object position in chamber 32. With this in mind, it should be noted that there is a required relationship between the positions of object 12, reference object 12' and viewing line 36. Generally speaking, let it be assumed that object 12, as viewed along viewing line 36 from point 14, is oriented in particular way. Once this is established, the reference object 12', as viewed from its associated viewing point, for example, along the viewing line 40 (from point 14), must also be oriented in substantially the same way. In other words, the angle between line 36 and the normal 38 to surface 12 must be the same as the angle between viewing line 40 and the normal 42 to surface 12'. In addition, for best results the objects are preferably viewed from the same optical distance. These required and preferred relationships are at least with respect to those surfaces of objects 12 and 12' which are to be viewed.

As stated above and in an acutal working embodiment of the present invention, object 12 is preferably a sheet of white paper having black or other such contrasting symbols, the symbol, i.e., the task, being designated by the reference numeral 12a, and the surrounding surface i.e., the background being designated 12b (see FIG.3). Reference object 12' is object 12 (acting in a different role) and therefore includes the identical task designated 12a' and the identical background designated 12b' as seen in FIG. 5. Also, in accordance with the working embodiment of the present invention, object 12 (positioned outside chamber 32) is oriented such that task 12a and background 12b, extending horizontally, are viewed along viewing line 36 from point 14 at an angle of approximately 25° with the line normal to the background. This is indicated by imaginary lines, lines 36 and 38 in FIG. 1 as stated previously. In a similar manner, the reference object 12', located within chamber 32, is oriented such that task 12a' and background 12b' are viewed along viewing line 40 from point 14 at an angle of approximately 25° with a line normal to the surface. This is illustrated in FIG. 1 by imaginary lines 40 and 42. As a further part of the preferred embodiment of the present invention, the optical distance between viewing point 14 and objects 12 and 12' is between approximately 14 inches and 16 inches.

Attention is now directed to FIGS. 2 and 4 which best illustrate optical arrangement 16. As shown in these figures, arrangment 16 includes a viewing segment 44 comprised of a first or common straight tubular viewing section 46 and two secondary straight tubular viewing sections 48 and 50. As shown, one end of common viewing section 46 defines viewing point 14 and the other end opens into an enlarged viewing segment 52 as do adjacent ends of secondary tubular sections 48 and 50. The otherwise free end of section 50 is mounted by suitable means such as a clamp 54 to the outside surface of shell 28 such that the opening through section 50 is in visual alignment with slot 35 through the shell.

The relative positions of tubular viewing sections 46, 48 and 50 and objects 12 and 12' should be noted. As illustrated in FIGS. 2 and 4, the secondary viewing sections 48 and 50 are angularly disposed relative to one another such that section 48 is in straight line alignment with the previously discussed imaginary line 36 and section 50 is in straight line alignment with previously discussed imaginary line 40. In this manner, the two objects 13 and 12' (actually the respective positions of the same object) are located equidistant from enlarged viewing segment 52 and identically oriented relative to this segment.

In addition to the foregoing, viewing segment 44 includes optical means which will allow one to view, alternatively, both objects 12 and 12' from viewing point 14, that is, from the free end of viewing section 46, such that both objects (actually the same object) are optically the same distance from viewing point 14 and such that both objects are identically oriented as viewed from viewing point 14, that is, viewed at the same angle. Any suitable optical means may be provided. However, in acccordance with the working embodiment of the present invention, this is accomplished by means of reflection. More specifically, viewing segment 44 includes a suitably sized mirror 56 which is positioned within enlarged segment 52. The mirror is mounted within this segment by suitable means including, for example, hinge pins 58 (FIG. 3), for movement between a first position and a second position to be described below. A nob such as nob 29 or other such externally located means innerconnected with mirror 56 may be provided for manually moving the mirror between its first and second positions.

In accordance with the present invention, the optical means referred to above not only allows the objects to be viewed at the same orientation, i.e., at the same angle but also in the same way. More specifically, the object 12 outside chamber 32 and the same object 12' in chamber 32 are seen through the optical means in the same way they would be seen if viewed directly without optical means. For example where the task 12a and hence 12a' is the letter L, this letter is seen in its normal position, that is, as the letter L, as viewed through the optical means from viewing point 14. To accomplish this, a conventional erector prism 57 is positioned within viewing section 48 (see FIG. 2) between the free end of this section and mirror 56 and another conventional erector prism 59 is positioned in viewing section 50 between slot 35 and mirror 56. These prisms and the mirror cooperate with the means for moving the object from its position outside chamber 32 to its position inside chamber 32, as will be described hereinafter.

With mirror 56 in one of its two positions, for example, a first position, as seen in FIG. 2, the image of object 12, that is, the task 12a and background 12b are refracted through prism 57 and reflected off the mirror and up section 46 to viewing point 14. This is best shown in FIG. 3 and FIG. 8 which illustrate how the object is seen as viewed through viewing section 46 from viewing point 14. Note that the task L (12a)is positioned so that if viewed directly (without optical means) through viewing section 48, it would be seen in its normal position. This is illustrated in FIG. 5 and FIG. 8(a). The mirror 56 flips the image end-over-end as illustrated in FIG. 8(b). However, erector prism 57 flips the image back end-over-end as illustrated in FIG. 8(c) so that the task is seen from viewing point 14 as it would be if viewed directly without optical means.

When the mirror is moved to its second position, as illustrated in FIG. 4, object 12', that is, the task 12a' and background 12b' of object 12' are seen from viewing point 14 through prism 59 (which refracts the images) and off of mirror 56 (which reflects the images). More specifically, note that the task L in its 12a' position, i.e., in chamber 32, is positioned so that if viewed directly (again without optical means) through viewing section 50, it would be seen in a position flipped end-over-end and side-over-side. This is illustrated in FIG. 5 and FIG. 9(a). The mirror 56 flips the image back end-over-end as illustrated in FIG. 9(b)and erector prism 59 flips this latter image back side-over-side as illustrated in FIG. 9(b). Thus, the task 12a',for example the letter L. as viewed from viewing point 14, is seen in its normal position and, in any event, it is seen in the same way as task 12a.

In addition to viewing segment 44, optical arrangement 16 includes an adjustable light filtering device 60 which is capable of transmitting variable amounts of visible light from one surface 62 to a second surface 64. It should be capable of preventing all visible light from passing and it should also be capable of varying the amount of light, preferably in a linear fashion, to a point where all of the light or substantially all of the light can pass. In addition, the filter is preferably of the neutral density type, that is, it should be capable of absorbing the same proportions of light at all light frequencies. Further, for reasons to be described hereinafter, the back surface, for example surface 64, should be capable of reflecting some or all light directed thereon.

One type of device which performs all of the foregoing functions is a disc-shaped variable beam-splitter. Such a device, which is well known in the art, passes variable amounts of light from one surface to an opposite surface and reflects variable amounts of light from these surfaces, depending upon where on the surfaces the light impinges. A beam-splitter of this type may be readily provided as device 60. However, it is to be understood that other suitable means may also be used as device 60.

For reasons to be described hereinafter, optical arrangement 16 includes an additional tubular section 66 which opens at one end into tubular viewing section 46 near viewing point 14 and which extends downwardly at, for example, a right angle to the tubular viewing section. Beam-splitter 60 is mounted for rotation as its center by suitable means 70 which in turn is mounted to tubular section 66. The disc is positioned at the forward juncture of tubular sections 46 and 66 and a 45° angle with the latter and partially extends into section 46 at least partially but preferably entirely over the opening in this section and over the top of section 66, as illustrated. In this manner, some, but preferably all of the light reflected off of mirror 56 towards viewing point 14 must pass through or at least impinge on the beam-splitter. Hence, each of the objects 12 and 12' is seen through the filtering device or beam-splitter. This is best illustrated in FIG. 3.

Optical arrangement 16 also includes an auxiliary light directing segment 72 which includes previously discussed tubular section 66 and which takes advantage of reflective surface 64 of beam-splitter 60. The primary objectives of segment 72 are to direct alternate beams of light of variable intensity up tubular section 66 and onto the back surface 64 of beam-splitter 60 such that at least some of the light from each of the beams of light is reflected towards viewing point 14, as illustrated by dotted lines in FIG. 4. As will be seen hereinafter, these alternate beams of light are associated with the alternate viewing of objects 12 and 12', respectively.

The beams of light just discussed, may be provided in any suitable manner such as, for example, by providing a separate adjustable light source or sources indicated generally at 73. As illustrated in FIG. 4, this light source or sources are mounted within an extension of light box 22, as indicated at 74, in a chamber 76 therein. As illustrated, the chamber is closed to the light box by means of a suitable partition 78. However, as discussed in the previously recited Griffith et al. application, advantage may be taken of the light source, actually sources, in previously described light box 22. One way in which this is accomplished is by opening the lower end of tubular section 66 into extension 74 of light box 22, which extension defines chamber 76. Suitable adjustable shutter arrangements could be provided in the partition 78 and function in the manner disclosed in the Griffith et al. application.

However, in accordance with a working embodiment of the present invention separate light source or sources 73 are used and automatically varied in intensity in a manner and for reasons to be discussed hereinafter. In this regard, for reasons also to be discussed hereinafter, the light sources have associated therewith a pair of interconnected light sensitive meters, for example conventional photoelectric cell arrangements, generally designated at 75a and 75b. These arrangements are positioned within tubular viewing section 46 with arrangement 75a being located adjacent to and on one side of filter disc 60 and the other located adjacent to and on the opposite side of the filter disc. Actually, only the light sensitive portions of the meters or arrangements need be positioned within section 46. The remaining portions, for example the electrical circuitry (not shown) would be located outside the viewing section. In either case, the portions located within section 46 should be of a size and be positioned so as not to obstruct must if any of the view through the viewing section. As will be seen below, arrangements 75a and 75b are coupled to light source or sources 73, as indicated by the dotted line 77 in FIG. 1, and include conventional means 79 so as to adjust the light from sources 73 until arrangement 75b sees the same amount of light off of and through filter disc 60 as arragement 75a sees in front of the disc.

The light coming from sources 73 in chamber 76 illuminates a suitably supported surface 87 similar to backgrounds 12b and 12b'. Light from this surface is directed up tubular section 66 and onto back surface 64 of beam-splitter 60 by any suitable optical means. For example, a mirror 88 can be appropriately positioned within chamber 76 for redirecting light from light sources 73 up the tubular section. This could be readily provided by those skilled in the art.

Having described most of assembly 10, attention is now directed to a mechanism 90 which is constructed in accordance with the present invention and which is provided for moving object 12 between its position outside chamber 32 (its evaluating position 12) and its position within chamber 32 (its reference position 12'). As illustrated best in FIGS. 5 and 6, mechanism 90 includes two spaced-apart parallel sidewalls 92a and 92b which extend the length of a continuous base 94 and which are supported on top of the base. These longitudinally extending sidewalls and the base 94 are preferably constructed of a light transparent material, for example clear plastic so as not to adversely effect the production of sphere illumination. A circular disc 98 preferably constructed of steel extends across the spacing between the sidewalls and has opposite edge portions located adjacent the inner surfaces of the sidewalls. As will be discussed below, the disc is supported on base 94 for (1) rotation about its center, as indicated by two way arrow 100 in FIG. 5, and (2) is supported for reciprocal movement along base 94, as indicated by two way arrow 102 in FIG. 5.

As illustrated best in FIG. 6, an off-center guide pin indicated at 108 extends down from disc 98. This guide pin has its top end fixedly connected with the underside of the disc and its bottom end is slideably located within a groove 110 located through base 94. As illustrated best in FIG. 5, this groove 110 extends from one end of base 94 to the other end of the base between the sidewalls 92a and 92b. The groove extends diagonally across the longitudinal extent of base 94 so that one end, for example its left end as viewed in FIG. 5, is positioned adjacent sidewall 92b and its right end is positioned adjacent sidewall 92a.

Disc 98 is moved between the position indicated by the solid lines in FIG. 5, i.e., at the left end of the base, to the position indicated by dotted lines, i.e., at the right end of the base, by means to be described with respect to FIG. 7. As the disc moves from its solid line position to its dotted line position, guide pin 108 which, as stated, is fixed to the disc, rides in groove 110. As this occurs, the guide pin is directed by the groove from the position adjacent sidewall 92b to a diametrically opposite position adjacent sidewall 92a. This, in turn, causes the disc to pivot approximately 180° causing the disc to rotate approximately 180°, as illustrated in FIG. 5. In order to aid in positioning disc 98 in its extreme position on base 94, permanent magnets, indicated at 111a and 111b may be utilized. As seen in FIG. 5, these magnets are respectively positioned and suitably mounted at opposite ends of base 94 so as to engage with and hold disc 98 when the latter reaches its extreme positions. To accomplish this, the disc, as stated is constructed of steel. In this regard, only a portion of the disc need be steel or other suitable metal and the remainder could be for example clear plastic. In addition, where magnets are not used, the entire disc could be clear.

As seen in FIG. 7, the disc is moved between its solid line position and dotted line position in FIG. 5 by means of an arrangement generally indicated at 112. This arrangement which is viewed looking up from under disc 98 includes a continuous cable 114. This cable extends around suitable mounted pulleys 116a and 116b located across from one another at the left end of base 94 and pulley 118 located at the opposite end of base 94 adjacent sidewall 92a. The cable is also suitably wound (one or more turns) around a driving drum 120. Previously described guide pin 108 is suitably fixed to cable 114 at a point between pulleys 116a and 118.

Driving drum 120 is driven either clockwise or counter-clockwise as indicated by two-way arrow 122 by a suitably mounted and powered small reversible electric gear motor (not shown). By rotating the driving drum in one direction, the disc and guide pin are moved from one end of base 94 to the other end. This procedure is reversed by reversing the direction of rotation of the driving drum. A conventional electronic circuit (not shown) controls the gear motor to automatically shut the motor off when the disc reaches its extreme position on base 94. The magnets 111a and 111b are used to ensure that the disc is pulled tightly into its end positions and also to ensure that the disc trails the guide pin as the latter beings to move so that the disc does not jam.

Returning to FIGS. 1 and 4, it can be seen that base 94 and sidewalls 92a and 94b are located on light box 22 and extend into chamber 32 through a small but appropriately sized opening through shell 28. When the disc 98 is in its solid line position (FIG. 5) it is also in its evaluating position in assembly 10, that is, it is located on the light box outside chamber 32 and in alignment with viewing section 48. By the same token when the disc is in its dotted line position (FIG. 5) it is in its reference position, that is, it is located within chamber 32 in alignment with viewing section 50. As shown in both of these figures and also in FIG. 5, the disc supports object 12, for example a sheet of paper with a task on it, for example the letter L. As will be seen hereinafter the disc and object is moved between these positions during operation of assembly 10. As will also be seen, this movement is carried out in synchronism with the movement of mirror 56 (see FIG. 2) for alternatively viewing the object through viewing section 48 and viewing section 50. In this regard, the mirror preferably includes means (not shown) for automatically moving it between the two positions described above in lieu of or in addition to nob 59 and means (not shown) are provided for connecting these last-mentioned means on the nob itself with mechanism 90 so that disc 98 is automatically located in its solid line position on support 20 when the mirror is located in the position illustrated in FIG. 2 and so that the disc and object are located in the dotted line position, i.e., in chamber 32, when the mirror is located in its other position, i.e., in alignment with viewing section 50.

It is to be understood the present invention is not limited specifically to arrangement 90 for moving object 12 between its solid line position as illustrated in FIG. 5 and its dotted line position. Any suitable means which accomplishes this, preferably also rotating the object 180°, may be readily provided in view of the present disclosure. However, what ever particular mechanism or arrangement is used, it is preferred that at least most of the arrangement, for example the sidewalls 92a and 92b and base 94 be constructed of a material which is transparent or at least translucent, but preferably transparent, to the light. This is particularly true of the portions of mechanisms 90 or other arrangement which is located within or intermittently located within chamber 32. This is preferable so that the mechanism or at least that part of the mechanism within chamber 32 does not appreciably adversely affect the spherical illumination produced within the chamber.

Having described assembly 10, attention is now directed to a method of determining the amount of equivalent sphere illumination, i.e., ESI, on an object utilizing this assembly. The first step is to select a particular object, which is preferably a sheet of light colored paper, for example white paper having a darker letter or letters on its top surface. In the embodiment illustrated, a white piece of paper having a black letter L (the task) on its top surface (background) is provided. The selected object, that is, object 12 is initially positioned in its solid line position (FIG. 5) outside chamber 32 with the task, for example the letter L being in the position shown in FIG. 5. In this regard, it should be noted that the object is positioned such that the task and background are seen through beam-splitter 60, preferably in their entirety from viewing point 14 in the same manner as they would be if viewed directly, as discussed with respect to FIG. 8. This is illustrated in FIG. 3 with respect to object 12.

Having positioned the object, i.e., the sheet in the manner discussed, the task and background of object 12 are viewed through tubular viewing section 46 from viewing point 14 through adjustable beam-splitter 60. The beam-splitter, which is preferably initially positioned so as to pass all light therethrough, is adjusted, i.e., by rotation, to a point which provides a specific degree of visibility of the task from the viewing point, preferably threshold visibility. At the same time or approximately the same time, the luminance of that portion of the background viewed through the beam-splitter is made to appear unchanged. In other words, the background, as viewed through the adjusted beam-splitter, is made to appear as it would if viewed without any light being filtered. This is preferably accomplished automatically by utilizing light directing segment 72 in conjunction with beam-splitter 60 and arrangements 75a and 75b, as will be described directly below. However, it is to be understood that it can be accomplished manually in the manner described in the Griffith et al application whereby a portion of object 12 is viewed outside the beam-splitter 60.

To accomplish the foregoing automatically, let it be first assumed that the beam splitter is in a position which allows substantially all light to pass therethrough from surface 62 to 64 and let it also be assumed that no light is directed up to surface 64 through tube 66 from light sources 73. Let it also be assumed that mirror 56 in its first position, that is, the position which allows one to view object 12 from viewing point 14. With these conditions met, beam-splitter 60 is adjusted, that is, rotated, thereby reducing the amount of light passing therethrough from surface 62 to surface 64. As this adjustment proceeds, the task becomes less visible and the liminance of that portion of the background viewed through the beam-splitter decreases. However, because of this, arrangement 75b sees less light passing through the beam-splitter. As a result, it continuously increases the intensity of sources 73, thereby continuously increasing the amount of light which is directed up the tubular section 66, some of which is reflected off the back surface 64 of the beam-splitter towards point 14. This light reflected off the back surface supplements the light passing through the beam-splitter from object 12 so that the luminance of that portion of the background being viewed through the beam-splitter from object 12 appears to arrangement 75b greater than would be the case if no light were reflected off the back surface 64. Arrangement 75b continues to increase the intensity of the light surce 73 until it sees as must light (from background 12b and surce 73) as is seen by arrangement 75a (from the background 12a only). In this regard, one with ordinary skill in the art could connect the two arrangements 75a and 75b and the light source or sources 73 and provide suitable comparison and feedback circuitry to accomplish this.

The beam-splitter is ultimately adjusted so that the task 12a is at threshold visibility from viewing point 14 while arrangement 75a and 75b automatically adjust source 73 so that the luminance of the background viewed through the beam-splitter from the point 14 appears indentical to the luminance of the background viewed in front of the beam-splitter, i.e., unchanged from point 14. Once this ultimate adjustment of the beam-splitter is made, it remains fixed throughout the rest of the procedure to be discussed below.

It should be pointed out that obtaining threshold visibility of the task 12a can and is preferably accomplished through visual inspection. Also, maintaining the background at what appears to be constant can be accomplished by visual inspection as described in the Griffith et al. application. However, it can and preferably is accomplished automatically by means of optical sensing as described above.

Having completed the initial segment of the present procedure for determining the amount of equivalent sphere illumination on object 12, the final segment of this procedure is begun. This first involves moving mirror 56 to its second position, that is, the position which allows viewing of reference object 12' from viewing point 14. At the same time, the object is moved, preferably automatically, into chamber 32 to its 12' position. This may be accomplished in the manner described above using mechanism 90. As stated above, the task 12a' and the background 12b' are viewed through the beam-splitter. In this regard, the task, for example the letter L is preferably rotated 180°, as discussed above, so that it is seen in the same way as it was when positioned outside the chamber, as discussed with respect to FIG. 9.

Once the mirror 56 and object are repositioned in the aforedescribed manner, the shutter arrangement 27 is progressively open from its initially closed position by, for example, nob 29. Hence, light enters into chamber 32 for providing sphere illumination on sheet 12'. At the same time, the light sensitive arrangements 75a and 75b readjust the intensity of sources 73 so that background 12b' appears unchanged, that is, so that the background continuously appears through the adjusted light filtering device as it would if not light were filtered. The background is continuously adjusted (to remain unchanged) until the task 12a' within chamber 32 is at threshold visibility as viewed through the beam-splitter from point 14. At this time, arrangements 75a and 75b cause background 12b', which is viewed through the beam-splitter from point 14, to still appear unchanged, i.e., as if it were viewed from point 14 without any light being filtered.

To assure that both tasks, that is, the task outside chamber 32 and the task inside the chamber are equally visible from viewing point 14 through the filter, mirror 56 can be moved to its initial position for viewing object 12 (as opposed to 12'). This causes disc 98 to automatically move back to its position outside chamber 32 carrying the object therewith. At this time, arrangements 75a and 75b automatically readjust to again cause background 12b to appear unchanged. Thereafter, the mirror and disc can be moved back again, thus comparing the visibility of the two tasks. If further adjustments are required, this can be readily done by the aforedescribed procedure.

Having followed the aforedescribed procedure, the amount of sphere illumination which is now on object 12', i.e., the object in chamber 32, is equal to the equivalent sphere illumination on object 12, i.e., the same object outside the chamber, as viewed from viewing point 14 at the angle at which the object is viewed. Hence, to determine this value, a meter 91 measuring illumination in foot candles may be provided on top side 24 within chamber 32. Because of slight imperfections in the production of sphere illumination, the meter or at least the sensor part of the meter is preferably positioned as close to object 34 as possible. A readout (not shown) could of course be provided outside of chamber 32.

It should be apparent from the foregoing, that the ESI value obtained depends on the particular lighting arrangement illuminating object 12. In this regard, for purposes of accuracy, the type of light sources in light box 22 are preferably similar to the light sources used in the particular arrangement being evaluated. It should also be apparent that the particular ESI value obtained also will depend upon the angle at which object is viewed from the given viewing points, for example, viewing point 14. As stated above, the particular 25° angle which was chosen to view object 12 and the distance at which it was viewed were chosen because this is the typical viewing angle and distance which a person sitting at a desk or flat table would read from if the piece of paper were located on that desk or table. The present invention is not limited to this positioning arrangement. In fact, in accordance with another standard, the angle would be 10° rather than 25°. This is because, quite often, the desk or table surface in some areas are tilted 15° from the horizontal.

It is to be understood that assembly 10, as described, is one embodiment of the present invention and is one way of carrying out the aforedescribed method. However, it is also to be understood that this method could be carried out by modified or actually different assemblies.

From the foregoing, it should be readily apparent that the method and assembly disclosed herein is similar in many respects to the method and assembly disclosed in the Griffith et al. Application cited and discussed above. However, it should be equally apparent from the foregoing that the method and assembly disclosed herein includes several specific improvements over the method and assembly disclosed in the Griffith et al. Application. It has been found for example, as stated previously, that the accuracy of ESI measurement is improved by using a single task as both the reference and evaluating task as opposed to two individual tasks, even two tasks which appear identical to the naked eye. In addition, by seeing the task in the same position in the chamber and out of the chamber and by seeing it as it would be seen if viewed directly, human error is minimized. This is accomplished, as discussed previously, by means of mirror 56, prisms 57 and 59 and rotation of the task approximately 180°, In addition, this is in contrast to the method and assembly disclosed in the Griffith Application wherein mirror images of the two tasks are seen from the viewing point.

What is claimed is:

1. A method of determining the amount of equivalent sphere illumination on a task as viewed from a given viewing point, said method including (a) locating said task and a contrasting colored reference in a lighted first area, said task and reference being oriented in a fixed way as viewed from said viewing point, (b) at said viewing point, viewing said task and reference through adjustable light filtering means, (c) adjusting said light filtering means to an adjusted position to provide specific visibility of said task from said viewing point and through said filtering means while causing the luminance of said reference at least to appear unfiltered as viewed through said adjusted filtering means from a predetermined point behind said filtering means regardless of the adjusted position of said light filtering means, (d) positioning a task and a reference in a second area, said last-mentioned task and reference, as viewed from as associated viewing point, being oriented in substantially the same way as said task and reference are oriented in said first area as viewed from said given viewing point, (e) illuminating said task and reference in said second area with sphere illumination, (f) with said light filtering means fixed in said adjusted position, viewing said task and reference in said second area through said filtering means from said associated viewing point, (g) varying the intensity of sphere illumination on said task and reference in said second area until the visibility of said task, as viewed from said associated veiwing point through said filtering means, is substantially equal to said specific visibility while causing the luminance of said reference in said second area at least to appear unfiltered as viewed through said filtering means from an associated predetermined point, and (h) thereafter, measuring the intensity of sphere illumination of said second task, the improvement comprising:

a. using a single task and reference as both said task and reference in said first area and said task and reference in said second area; and b. moving said single task from said first area to said second area after said step of adjusting said light filtering means.

2. The improvement according to claim 1 including rotating said single task a predetermined amount as it moves from said first area to said second area.

3. The improvement according to claim 2 wherein said task is rotated approximately 180°.

4. The improvement according to claim 1 including: viewing said single task through optical means and positioning said single task alternatively in said first and second areas and providing said optical means such that said single task, as viewed alternatively from said viewing point and associated viewing point, is seen as it would be if viewed directly and is seen in the same way from both viewing points.

5. The improvement according to claim 1 wherein the luminance of said single reference is automatically made to appear unfiltered as viewed through said filtering means.

6. A method of determining the amount of equivalent sphere illumination on an object as viewed from a selected viewing point, said method including (a) positioning a specific object including a flat surface having a darker colored symbol thereon in a lighted first area, (b) selecting a viewing point and orienting said object relative to said point such that, at said point, the flat surface of said object is viewed at an acute angle to a line normal to said surface, (c) at said viewing point, viewing said surface through adjustable light filtering means, (d) adjusting said light filtering means to a position which will provide threshold visibility of said symbol, as viewed from said viewing point and causing the luminance of said flat surface at least to appear unfiltered as viewed through said adjusted filtering means from said viewing point regardless of the adjusted position of said filtering means, (e) positioning a reference object including a flat surface having a symbol thereon in a second area said second area being partially defined by a hemispherical surface which substantially uniformly diffusely reflects light directed thereon, (f) orienting said reference object relative to said selected viewing point such that, at said point, the flat surface of said reference object is viewed at an acute angle to a line normal to said last-mentioned surface, said last-mentioned angle being substantially identical to the angle at which said specific object is in view, (g) illuminating said reference object with sphere illumination, (h) with said light filtering means in said adjusted position, viewing said reference object through said filtering means from said viewing point, (i) varying the intensity of sphere illumination on said reference object until the visibility of the symbol on said reference object, as viewed from said viewing point through said light filtering means, is substantially equal to the threshold visibility of the symbol on said specific object as viewed from said viewing point through said filtering means and causing the luminance of the flat surface of said reference object at least to appear unfiltered as viewed through said adjusted filtering means from said viewing point, and (j) thereafter measuring the intensity of sphere illumination, the improvement comprising:
 a. using a single object including a flat surface having a darker colored symbol thereon as both said specific object and said reference object; and
 b. moving said single object from said first area to said second area after said step of adjusting said light filtering means.

7. The improvement according to claim 6 including:
 a. rotating said single object approximately 180° as it moves from said first area to said second area;
 b. alternatively viewing said single object in said first area and said second area from said viewing point through optical means; and
 c. positioning said single object alternatively in said first and second areas and providing said optical means such that said single symbol, as viewed alternatively from said viewing point, is seen as it would be if viewed directly and is seen in the same way from both viewing points.

8. An assembly for determining the amount of equivalent sphere illumination on a task, said assembly including (a) means for supporting said task and contrasting colored given reference in a lighted area, (b) a substantially closed housing including means for supporting a task and a contrasting colored reference therein, (c) means for illuminating said task and said reference within said housing with sphere illumination, (d) means for adjusting the intensity of sphere illumination on said task and reference within said housing, (e) adjustable light filtering means, (f) means for simultaneously viewing said task and reference in said lighted area through said light filtering means and for simultaneously viewing said task and reference in said housing through said light filtering means, whereby the visibility of said task, as viewed through said filtering means, can be altered by adjusting said light filtering means, (g) means for making the luminance of said reference at least appear unfiltered, as viewed through said filtering means, regardless of changes in visibility of said task, and (h) means for measuring the intensity of sphere illumination on said task and reference in said housing, the improvement comprising:
 means for moving a single task and contrasting colored reference from said supporting means in said lighted area to said supporting means in said housing, said single task and reference being used as both said task and reference in said lighted area and said task and reference in said housing.

9. The improvement according to claim 8 including means for rotating said single task a predetermined amount as it moves from said supporting means in said lighted area to said supporting means in said housing.

10. The improvement according to claim 9 wherein said task is rotated approximately 180°.

11. The improvement according to claim 8 wherein said viewing means includes optical means for viewing said single task and reference in said lighted area and in said housing, said single task being positioned on said supporting means in said lighted area and on said supporting means in said housing such that said single task, as viewed by said optical means, is seen as it would be if viewed directly and is seen in the same way in said lighted area and in said housing.

12. The improvement according to claim 8 wherein said viewing means includes movable optical means for alternatively viewing said single task and reference in said lighted area and in said housing and including means for moving said optical means from a first position for viewing said task and reference in said lighted area to a second position for viewing said task and reference in said housing, said last-mentioned means being connected to said task and reference moving means for automatically moving said task and reference when said optical means is moved from its first position to its second position.

13. The improvement according to claim 8 wherein a portion of said moving means is located within said housing, at least a part of said portion being substantially transparent to light.

14. An assembly for determining the amount of equivalent sphere illumination on a task, said assembly including (a) means for supporting said task and a contrasting colored reference in a lighted area, (b) a substantially closed housing including (i) an internal hemispherical surface which substantially uniformly diffusely reflects light directed thereon, and (ii) an internal flat surface capable of passing light therethrough and adpated to support a task and contrasting colored second reference, (c) means providing light through said flat surface and into said housing for illuminating said task and reference within said housing with sphere illumination, (d) means for varying the light passing through said flat surface and into said housing whereby to vary the intensity of sphere illumination of said task and reference within said housing, (e) an optical device having opposite first and second surfaces, said device being capable of passing variable amounts of light therethrough from said first surface to said second surface along a predetermined path and being capable of reflecting off of said second surface at least some light which is directed onto said second surface, (f) means for supporting said optical device in a predetermined orientation, (g) means for viewing simultaneously said task and reference in said lighted area from a predetermined viewing point through said optical device and for alternatively viewing simultaneously said task and reference in said housing from said viewing point through said optical device, whereby the visibility of said task, as viewed through said device from said viewing point, can be altered by varying the amount of light passing through said device from said first surface to said second surface, (h) means for making the luminance of said reference at least appear unfiltered, as viewed through said optical device, regardless of the changes in visibility of said tasks, (i) means for measuring the intensity of sphere illumination on said second task and second reference, the improvement comprising:

means for moving a single task and contrasting colored reference from said supporting means in said lighted area to said supporting means in said housing, said single task and reference being used as both said task and reference in said lighted area and said task and reference in said housing.

* * * * *

UNITED STATES PATENT AND TRADEMARK OFFICE
CERTIFICATE OF CORRECTION

PATENT NO. : 4,055,383

DATED : October 25, 1977

INVENTOR(S) : Robert Dale Zeller & Daryl Dean Sullivan

It is certified that error appears in the above-identified patent and that said Letters Patent are hereby corrected as shown below:

Column 1, line 54, "(Griffith et al.)" should read --(Griffith et al)--.

Column 2, line 57, "liminance" should read --luminance--.

Column 3, line 11, "itis" should read --it is--.

Column 3, line 18, "As" should read --At--.

Column 3, line 19, "liminance" should read --luminance--.

Column 3, line 28, "as" should read --at--.

Column 4, line 14, "l" should read --L--.

Column 6, line 44, "13" should read --12--.

Column 6, line 65, "29" should read --59--.

Column 7, line 9, L should read --"L"--.

Column 7, line 10, L should read --"L"--.

UNITED STATES PATENT AND TRADEMARK OFFICE
CERTIFICATE OF CORRECTION

PATENT NO. : 4,055,383
DATED : October 25, 1977
INVENTOR(S) : Robert Dale Zeller & Daryl Dean Sullivan It is certified that error appears in the above-identified patent and that said Letters Patent are hereby corrected as shown below:

Column 7, line 49, "9(b)" should read --9(c)--.

Column 7, line 49, L. should read --L,--.

Column 8, line 47, "Griffith et al." should read --Griffith et al--.

Signed and Sealed this

Sixteenth Day of May 1978

[SEAL]

Attest:

RUTH C. MASON
Attesting Officer

LUTRELLE F. PARKER
Acting Commissioner of Patents and Trademarks